United States Patent [19]

Francis

[11] 4,370,525

[45] Jan. 25, 1983

[54] VARIABLE RATE TIMING CIRCUIT

[75] Inventor: Gordon K. Francis, Boulder, Colo.

[73] Assignee: Bell Telephone Laboratories, Incorporated, Murray Hill, N.J.

[21] Appl. No.: 209,886

[22] Filed: Nov. 24, 1980

[51] Int. Cl.³ .................. H04Q 11/04; H03K 17/296; H03K 21/30

[52] U.S. Cl. ................................ 179/16 A; 179/2.51; 179/18 FA; 328/44; 328/129; 328/75

[58] Field of Search .......................... 328/129, 44, 75; 179/2.51, 16 A, 18 FA

[56] References Cited

U.S. PATENT DOCUMENTS 3,521,171  7/1970  Pinkert ................................ 328/129
4,079,315  3/1978  Mohr ............................. 328/129 X
4,275,354  6/1981  Suematsu et al. ............. 328/129 X Primary Examiner—John S. Heyman
Attorney, Agent, or Firm—R. O. Nimtz

[57] ABSTRACT

A digital subscriber loop carrier system (FIG. 1) is disclosed in which voice information and supervisory signal information are encoded in pulse code form and multiplexed together into a single digital pulse stream for transmission between a central office location and a remote subscriber location. In order to provide appropriate timing and decoding of the supervisory signals, a multistate timing circuit (FIG. 4) is provided which permits timing a plurality of periods of substantially different durations by enabling different rate clock pulse sources to be applied to the timing counter.

7 Claims, 5 Drawing Figures

REMOTE TERMINAL CHANNEL UNIT

VARIABLE RATE TIMING CIRCUIT

BACKGROUND OF THE INVENTION

1. Field of the Invention

This invention relates to digital timing circuits and, more particularly, to timing circuits utilizing a variable rate driving signal to obtain variable time periods.

2. Description of the Prior Art

Digital transmission systems are well-known in which telephone voice subscriber signals are converted to pulse code modulated form for multiplexed transmission over a digital transmission facility. One such system is disclosed in the copending application of S. J. Brolin, Ser. No. 57,333, filed July 13, 1979, issued as U.S. Pat. No. 4,271,509 on June 2, 1981.

In such a system, each of a plurality of subscriber voice signals is encoded into an eight-bit pulse code modulated (PCM) code and the code words from each of the plurality are assigned to sequential time-slots on the transmission facility. When such a system is utilized in the telephone subscriber loop plant (the connection between the local telephone office and the telephone subscriber), it is necessary to transmit a variety of supervisory signals on the transmission system in addition to the encoded voice signals. One system for transmitting such supervisory signals utilizes the least significant position of a PCM word every sixth frame of the multiplexed signal. Successive pairs of such bits can then be used to transmit a dual bit supervisory code representing the supervisory control information transmitted on the line, as shown in the above-noted Brolin application.

In a digital subscriber loop transmission system where supervisory signals are translated to digital pulse form, it is necessary to ensure against inadvertent duplication of a valid supervisory code by bits or other noise on the transmission medium. Such verification is generally accomplished by ensuring that the valid code persists for a predetermined period of time prior to recognizing the reception of a valid signaling code. The verification function can be best accomplished by the use of sequential circuits such as digital counting circuits responsive to the reception of valid codes and which counts clock pulses up to a preselected count. When a number of such supervisory codes must be timed, or if other functions associated with supervisory signaling must be timed, it becomes convenient to use a single sequential circuit (digital counter) to count the timing periods for all of these various different functions.

When using a digital counter to generate a plurality of different timing periods, the granularity of the counting process, i.e., the repetition rate of a clock signal being counted, becomes important. In order to accurately count short periods of time, it is desirable to provide a clock repetition rate sufficiently fast to accurately identify the shorter periods. On the other hand, long timing periods which do not necessarily require the same timing accuracy would suggest longer periods between the clock pulses being counted. The solution to this dilemma at the present time is the provision of two or more different counters operating at different clock frequencies to provide the different timing periods. This solution, however, requires additional circuitry, thus increasing the cost, size and complexity of the overall circuit and reducing its reliability.

SUMMARY OF THE INVENTION

In accordance with the illustrative embodiment of the present invention, timing periods of substantially different lengths are provided with a single digital counter by utilizing the counter output states themselves to control the clock repetition rate. It is therefore possible to use the same counter circuit to count accurately very short periods (by utilizing a high repetition rate clock) and also to count longer timing periods (by using a low repetition rate clock).

Utilizing the principles of the present invention, it is possible to consider the digital counter as a multistate machine in which transitions between states can be timed by different, but controlled, time intervals. It is therefore unnecessary to provide analog timing circuitry for the time intervals, and it is possible to use a single counter for multiple timing intervals regardless of their relative duration. This timing arrangement has a further advantage of permitting the entire timing circuit to be realized in integrated circuit form, thus significantly reducing the cost and size of the timing circuit.

DETAILED DESCRIPTION

Figure 1:
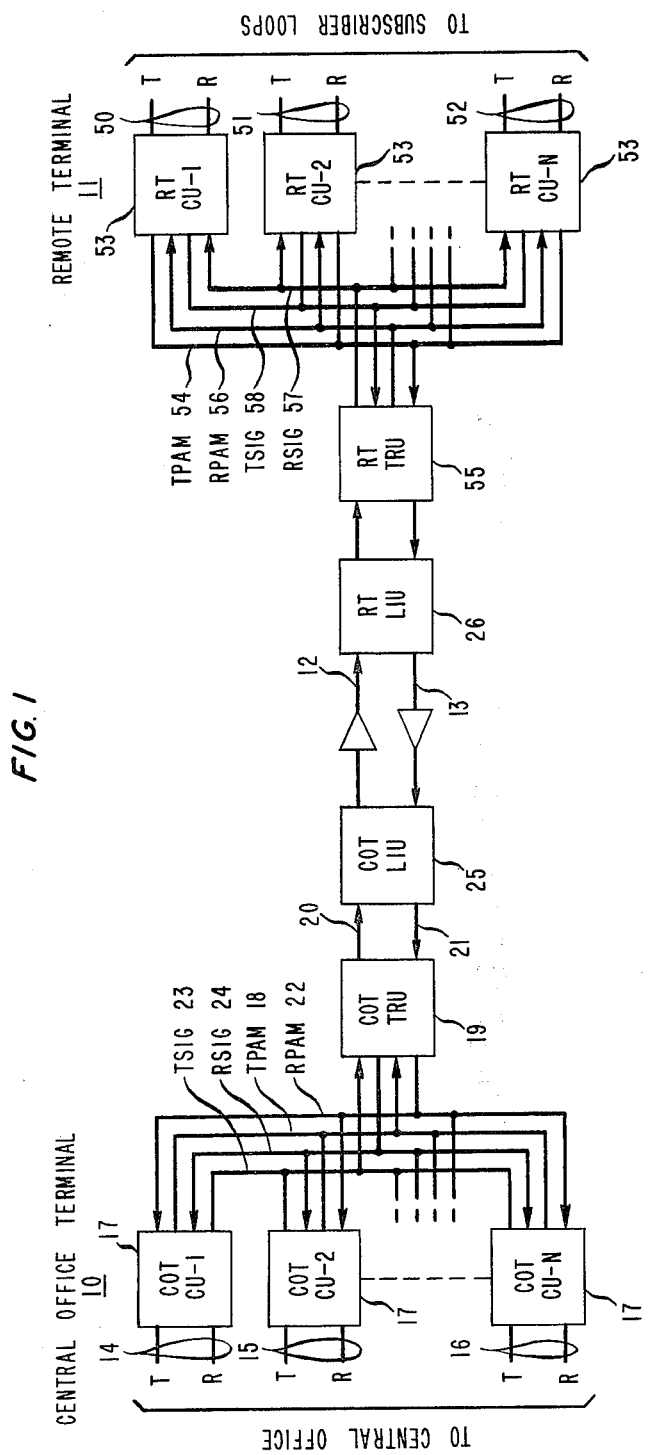
FIG. 1 is a general block diagram of a digital subscriber loop carrier system in which the present invention might find use.

Referring more particularly to FIG. 1, there is shown a general block diagram of a digital subscriber loop transmission system comprising a central office terminal 10 and a remote terminal 11 interconnected by a pair of repeatered transmission lines 12 and 13. Central office terminal 10 comprises a plurality of central office appearances 14, 15 . . . 16 of telephone subscriber appearances each comprising a tip conductor and a ring conductor. These conductors are connected through main frame interconnection apparatus to a telephone switching machine. Each pair of telephone conductors 14 through 16 is terminated on a channel unit 17 identical to the channel units provided for each of the other central office appearances 14 through 16.

Channel units 17 serve several functions. First, in the response to timing signals (not shown), channel unit 17 derives a time-slotted pulse amplitude modulated (PAM) pulse on a transmitting PAM bus 18. This function is accomplished by sampling the input voice signal under the control of appropriately time-slotted clock signals. Since the clock signals provided to each of the channel units 17 are in different time-slots, the signal on bus 18 is a time multiplexed pulse amplitude modulated pulse signal which is delivered to a transmit-receive unit 19. Transmit-receive unit 19 includes a pulse code modulation encoder to which the PAM samples on bus 18 are applied. This encoder encodes each sample into an eight-bit pulse code modulated (PCM) word and assembles these PCM words into a single multiplexed bit stream on output line 20. Included in the bit stream on line 20 are framing and synchronizing signals which enable the remote terminal 11 to frame and demultiplex the bit stream. Line 20 is connected through line interface unit (LIU) 25 to repeatered transmission line 12.

Transmit-receive unit 19 also receives a multiplexed bit stream on line 21 from LIU 25 and demultiplexes this bit stream by detecting and responding to the framing and synchronizing signals. The demultiplexed PCM codes are decoded in transmit-receive unit 19 and applied to a receiving PAM bus 22. Under the control of receive clock signals, a particular PAM sample in each frame is selected by the various ones of channel units 17 and the resulting demultiplexed PAM stream is filtered to remove the sampling frequencies. An analog voice signal is then delivered to the appropriate one of central office appearances 14 through 16.

In addition to the analog voice signals appearing on central office appearances 14 through 16, there also appears various types of supervisory signals which must be transmitted through the transmission system for delivery to the distant subscriber at remote terminal 11. These supervisory signals include, for example, single party ringing signals, multiparty ringing signals, coin station control signals, test request signals, and other direct current or voltage indications on central office appearances 14 through 16. These various supervisory signals must be recognized by the channel units 17 and encoded for multiplexing on the digital pulse stream and transmission to the remote terminal 11. Under the control of appropriate timing signals, the encoded supervisory signals are supplied to a transmit signaling bus 23 which is connected to transmit-receive unit 19 and multiplexed, along with the encoded voice signals, on transmission line 20. As noted in the aforementioned copending application of S. J. Brolin, these supervisory signals can be encoded by various permutations of the so-called A and B bits in the least significant bit position of every six PCM code word.

Supervisory information from remote terminal 11 is likewise multiplexed in the bit stream on line 21 and applied to transmit-receive unit 19. Such supervisory control signals from remote terminal 11 might include, for example, off-hook signals, dial pulsing signals, and automatic subscriber identification signals for multiparty lines. These signals are multiplexed on the pulse stream on line 21 in the same manner as outgoing supervisory signals are multiplexed on line 20. Under the control of appropriate clocking signals in transmit-receive unit 19, the supervisory signals are recovered and applied to receive signaling bus 24. This bus is connected to each of channel units 17 and, under the control of timing signals, the signaling information is applied to the appropriate one of channel units 17. In channel unit 17, the appropriate supervisory information is decoded from these codes and used to properly condition the central office appearances 14 through 16. The voltage and current conditions applied to appearances 14 through 16 are used to signal the central office equipment of the supervisory state of the subscriber stations at remote terminal 11. Line interface units 25 and 26 are connected at either end of transmission facilities 12 and 13 to prepare the digital pulse stream for transmission on the transmission media 12 and 13 and to recover these signals from the transmission media at the far end.

Remote terminal 11 is in all respects substantially identical to central office terminal 10. A plurality of subscriber appearances 50, 51, ... 52 are terminated on channel units 53, all identical to each other. Voice signals originating at subscriber stations connected to appearances 50 through 52 are used to generate pulse amplitude modulated pulses on TPAM bus 54 for delivery to transmit-receive unit 55. Similarly, multiplexed pulse amplitude modulated pulses are derived by TRU 55 and supplied to RPAM bus 56. Supervisory signals in the receive pulse stream are supplied to a RSIG bus 57 for delivery to channel units 53. Supervisory signals originating at the subscriber stations are encoded in channel units 53 and supplied to a transmit signaling bus 58, connected to transmit-receive unit 55. As noted in connection with central office terminal 10, the pulse amplitude modulated signals and the control signals are both encoded and multiplexed together into a single digital pulse stream by means of transmit-receive unit 55. A more detailed description of units 19, 25, 26 and 55 can be found in J. H. Green et al. U.S. Pat. No. 4,059,731, granted Nov. 22, 1977.

Figure 2:
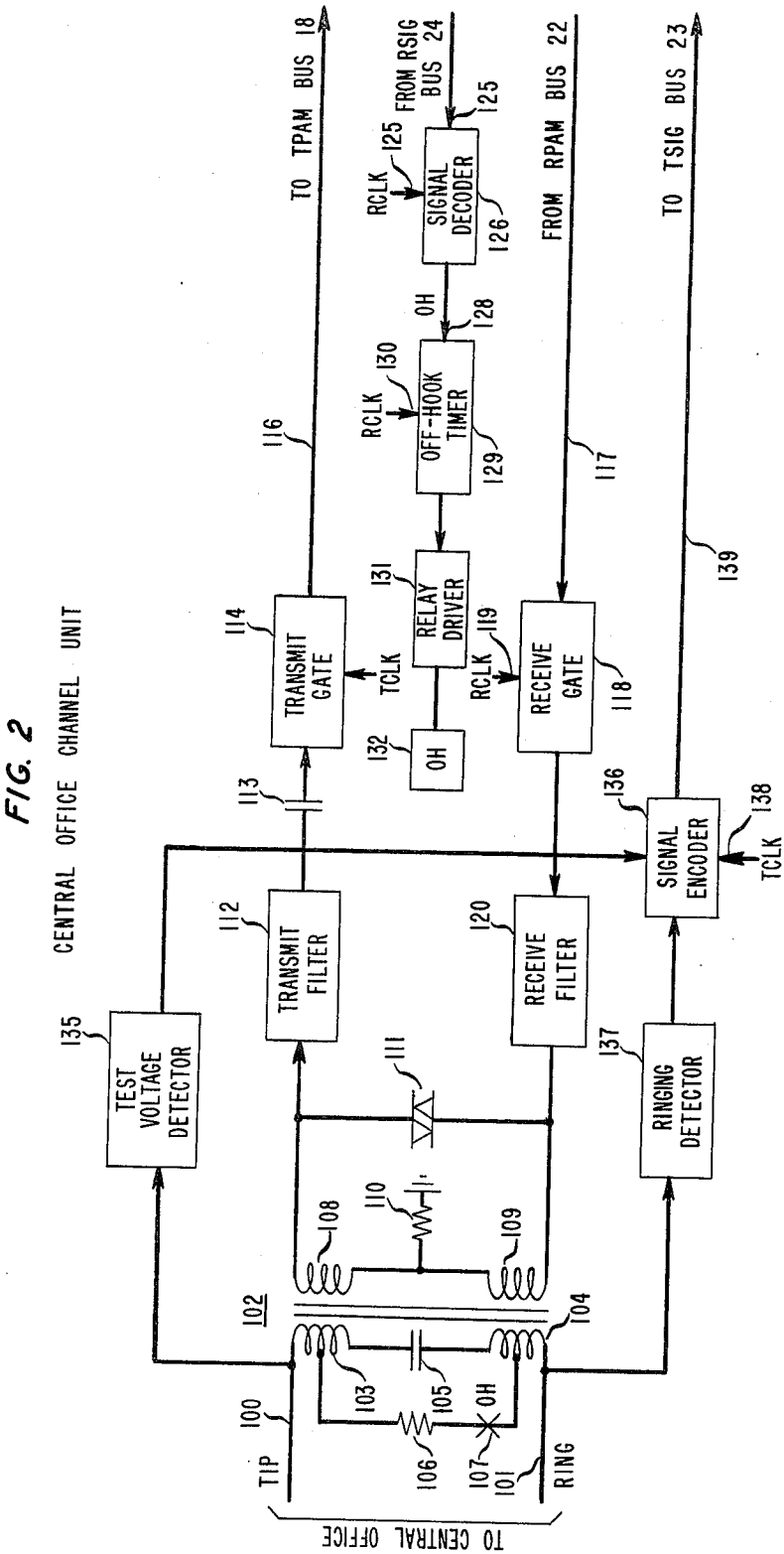
FIG. 2 is a more specific block diagram of a central office channel unit useful in the system of FIG. 1.

Referring now to FIG. 2, there is shown a detailed block diagram of one of the central office channel units 17 of FIG. 1. The central office channel unit of FIG. 2 comprises a tip conductor 100 and a ring conductor 101 which are derived from the central office equipment. These conductors are connected to hybrid transformer 102 through primary windings 103 and 104, interconnected by capacitor 105. Capacitor 105 blocks direct current flow through the transformer windings 103 and 104. A terminating resistor 106 is connected by normally open contacts 107 between a center tap on winding 103 and a center tap on winding 104.

Secondary windings 108 and 109 of transformer 102 are connected together, the center tap being grounded through resistor 110. A varistor 111 is connected across windings 108 and 109 to protect the electronic circuitry from excessive voltage surges. A transmit filter 112 is connected to winding 108 to receive analog voice signals and limit the frequency range of these signals to a preselected voice frequency band. These filtered voice signals are applied through capacitor 113 to transmit gate 114. Under the control of the transmit clock pulse on lead 115, gate 114 generates pulse amplitude modulated samples of the voice signal from capacitor 113 and delivers these samples on lead 116 to TPAM bus 18 of FIG. 1. PAM pulses from RPAM bus 22 of FIG. 1 are delivered by way of lead 117 to receive gate 118. Under the control of receive clock pulses on lead 119, gate 118 selects the appropriate PAM samples for this channel unit and delivers these samples to receive filter 120. Filter 120 removes the sampling frequencies from the PAM pulse samples and delivers an analog voice signal to winding 109 of transformer 102. This voice frequency signal is then transferred through transformer 102 to the tip end ring conductors 100 and 101 for delivery to the central office equipment.

Supervisory signals from RSIG bus 24 of FIG. 1 are delivered by way of lead 125 to signal decoder 126. Decoder 126, under the control of receiving clock pulses on lead 127, selects supervisory codes from bus 24 which are applicable to this particular channel unit. These signals are decoded and applied by way of lead 128 to a timing circuit 129. For the purposes of simplicity, it is assumed that the only signaling condition to be returned by the remote terminal 11 of FIG. 1 is the off-hook signal which indicates either a request for service or dial pulse interruptions. This signal is applied to off-hook timer circuit 129, which is under the control of a receive clock signal on lead 130. Timer 129 may comprise, for example, a counter driven by clock pulses on lead 130 to time the duration of the off-hook signal from coder 126. Only after this off-hook signal has persisted for a preselected length of time does timer 129 produce an output signal to relay driver circuit 131. Driver circuit 131, in turn, operates off-hook relay 132 which closes normally open contacts 107 to connect resistor 106 between tip conductor 100 and ring conductor 101.

It can thus be seen that an off-hook signal originated at a subscriber station at the remote terminal 11 is detected at remote terminal and encoded for insertion in the pulse stream transmitted remote terminal 11 to central office terminal 10. This supervisory information is then decoded in decoder 126 and used to operate off-hook relay 132. When operated, relay 132 connects a resistor 106 across the central office appearance comprising of conductors 100 and 101 to provide to the central office an off-hook indication. Central office apparatus, such as a line relay, is then operated to either initiate a service request from the switching machine or to record the dial pulses thereby received. The off-hook supervisory information is transmitted through the digital carrier system and relayed to the central office in the same form as it would have appeared if a conventional metallic loop was connected to conductors 100 and 101.

Connected to conductor tip 100 is a test voltage detector 135 which detects a test voltage of approximately 116 volts delivered through a resistance of 8K ohms. This test voltage can be used, for example, to initiate a test sequence such as that described in the copending application of S. J. Brolin et al., Ser. No. 97,699, filed Nov. 27, 1979. The output of detector 135 is supplied to a signal encoder 136.

Ring conductor 101 is connected to a ring detector circuit 137 which detects ringing signals appearing on conductor 101 and provides indication of such signals to signal encoder 136. Signal encoder 136, under the control of transmit clock signals on lead 138, encodes the test signal from detector 135 and the ring signal from detector 137, and transmits time-slotted codes on lead 139 for delivery to TSIG bus 23 of FIG. 1. These encoded supervisory signals are recovered at the remote terminal 11 and used to control ringing and test functions taking place in connection with the subscribers connected to remote terminal 11.

Figure 3:
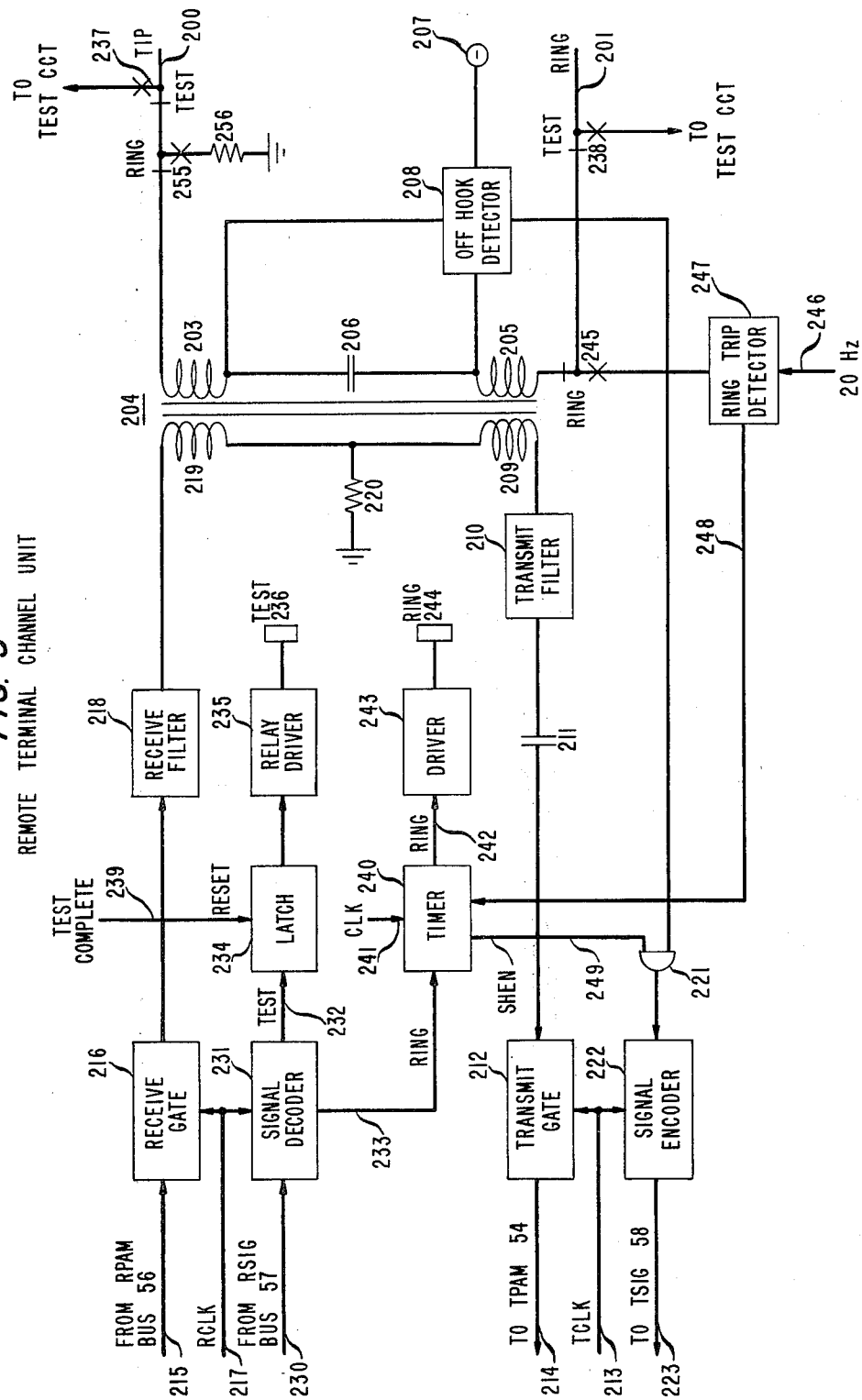
FIG. 3 is a more detailed block diagram of a remote terminal channel unit useful in the system of FIG. 1 and which makes use of the variable rate timing arrangements of the present invention.

In FIG. 3 there is shown a detailed block diagram of a remote terminal channel unit corresponding to channel units 53 of FIG. 1. The channel unit 53 comprises a tip conductor 200 and a ring conductor 201 which are connected to a subscriber station set at the remote location. Tip conductor 200 is connected to primary winding 203 of hybrid transformer 204. Similarly ring conductor 201 is connected to winding 205 of hybrid transformer 204. Windings 203 and 205 are separated by capacitor 206 to prevent direct current conduction therebetween. Talking voltage is supplied to conductors 200 and 201 from a supply voltage source 207, supplied through an off-hook detector 208 to wndings 203 and 205. Off-hook detector 208 senses the flow of current from supply 207 through conductors 200 and 201 to the subscriber station and thus detects the off-hook condition.

Secondary winding 209 of transformer 204 is connected to a transmit filter 210 which, like filter 112 in FIG. 2, limits the frequency range of the voice frequency signals supplied to it. The filtered output from transmit filter 210 is supplied through capacitor 211 to transmit gate 212. Under the control of transmit clock signals on lead 213, gate 212 supplies pulse amplitude modulated pulses on lead 214 to TPAM bus 54 of FIG. 1.

Received pulse amplitude modulated samples from RPAM bus 56 of FIG. 1 are delivered by way of lead 215 to receive gate 216. Like receive gate 118 in FIG. 2, gate 216, under the control of receive clock pulses on lead 217, selects the appropriate PAM samples for this channel unit and delivers these samples to receive filter 218. Filter 218 removes the sampling frequencies from the PAM pulse stream and delivers an analog voice signal to winding 219 of transformer 204. This voice signal, by way of hybrid action, is then delivered to conductors 200 and 201 for transmission to the subscribers telephone set. A resistor 220 connects the midpoint of windings 209 and 219 to ground potential.

The off-hook signal developed by off-hook detector 208 is supplied through AND gate 221 to signal encoder 222. Encoder 222, under the control of transmit clock signals on lead 213, encodes the off-hook condition and supplies the off-hook pulse code by way of lead 223 to TSIG bus 58 of FIG. 1. It is these off-hook signals which are detected by the signal decoder 126 in FIG. 2 to operate off-hook relay 132.

The encoded supervisory signals from signal encoder 136 of FIG. 2 are transmitted in the multiplexed pulse stream and delivered from RSIG bus 57 to lead 230 in FIG. 3. These signals are applied to signal decoder 231 which, under the control of receive clock pulses on lead 217, separates the test code signal from the ringing code signal, providing an indication of the test code signal on lead 232 and of the ringing code signal on lead 233. The test code signal is applied to a latch circuit 234 which, when operated, enables relay driver circuit 235 to operate test relay 236. Test relay contacts 237 and 238 connect tip conductor 200 and ring conductor 201, respectively, to testing circuitry (not shown) for the purposes of carrying out tests of the loop from the remote terminal 11 to the subscriber station. When these tests have been completed, a test complete signal on lead 239 releases latch circuit 234 which, in turn, releases test relay 236 and contacts 237 and 238. In this way, following the completion of the testing procedures, conductors 200 and 201 are reconnected to the hybrid transformer 204 for normal voice communication.

Ringing code from the central office terminal 10 of FIG. 1 is decoded by decoder 231 to supply a signal on lead 233 to timer circuit 240. Timer circuit 240, under the control of clock signals on lead 241, times the duration of the ringing signal providing a sufficiently long delay to insulate against inadvertent duplication of the ringing code for brief intervals. After the ringing code persists on lead 233 for a preselected interval, as determined by timer 240, an output signal on lead 242 is supplied to relay driver circuit 243 to operate ring relay 244. When operated, ring relay 244 operates transfer contacts 245 to connect ring conductor 201 to a ringing supply source from lead 246 through ring trip detector 247. Ring trip detector 247 detects the ring trip condition when the subscriber lifts his handset in response to the telephone ringing signal. Detector 247 provides a ring trip signal on lead 248 to timer 240.

Since it is undesirable to monitor the subscriber loop for the off-hook condition during the ringing state, and for a substantial period (60 ms) thereafter, a switch hook enable signal on lead 249 is supplied to AND gate 221.

Thus, the output of off-hook detector 208 is not applied to signal encoder 222 until the switch hook enable signal appears on lead 249. Ring relay 244 also operates transfer contacts 255 to connect tip conductor 200 through resistor 256 to ground potential, thus providing a ground return for the ringing signal.

It will be noted that timer 240 provides several timing functions. First, timer 240 must time the duration of ringing request signals on lead 233 before operating relay 244. When relay 244 is operated, timer 240 must be able to release relay 244 when an output signal is supplied from ring trip detector 247. Timer circuit 240 must also release ring relay 244 following the cessation of input signals on lead 233. Finally, timer 240 must disable switch hook detection for a period following the release of relay 244 to allow the ringing transients on the loop to decay and thereby prevent incorrect off-hook information from being generated and transmitted to the central office terminal. In accordance with the present invention, all of these timing functions are provided by a single timing circuit 240 which is driven by a variable clock signal as will be discussed in connection with FIG. 4.

Figure 4:
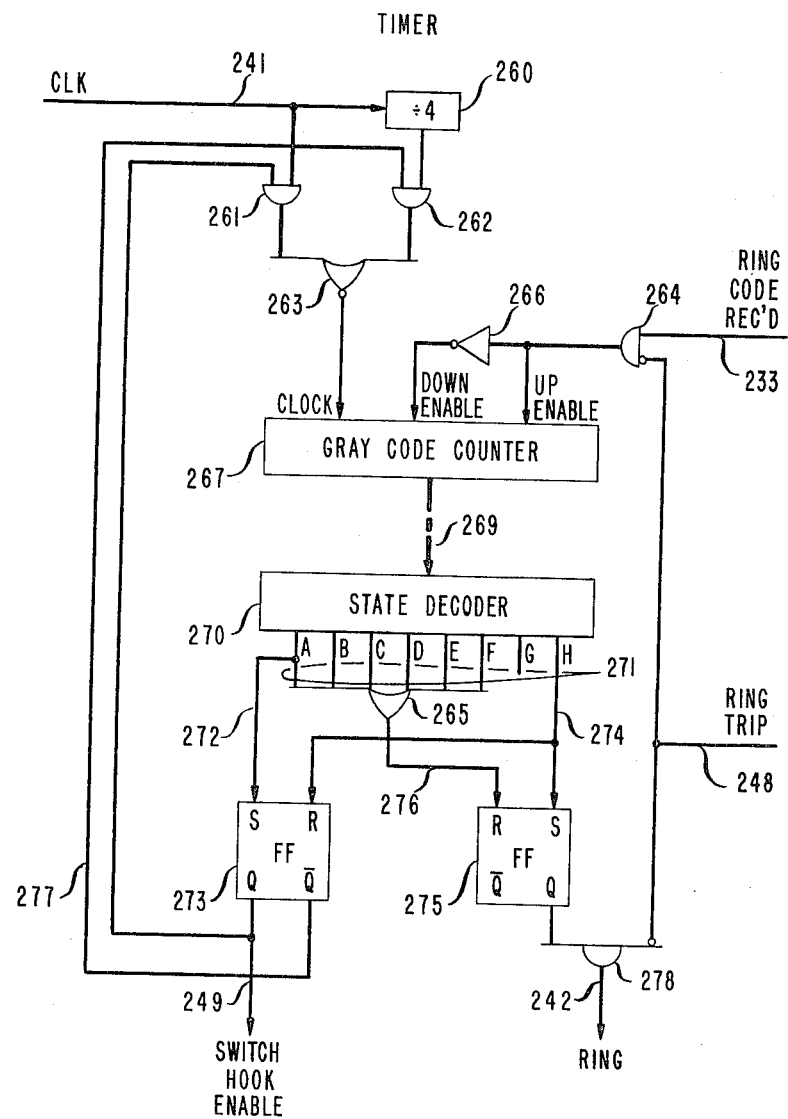
FIG. 4 is a detailed logic diagram of the variable rate timer used in the channel units of FIG. 3.

Referring more particularly to FIG. 4, there is shown a detailed block diagram of the timer circuit 240 of FIG. 3. Thus, a clock input is supplied on lead 241 and a ring trip detector input signal is supplied on lead 248. The ringing code received signal is supplied on lead 233 and the timing output signals from the circuit of FIG. 4 are supplied on lead 242 (ring) and lead 249 (switch hook enable). The above reference numerals are identical to those used in FIG. 3.

The clock signal lead 241 is applied to a divide-by-four circuit 260. The input to divide circuit 260 is supplied to AND gate 261 while the output of divide circuit 260 is supplied to AND gate 262. Thus, the input to gate 261 is a rapid clock signal while the input to gate 262 is a much slower clock signal. It is these two clock signals which are controlled to provide variable clock inputs to the timing circuit.

The outputs of AND gates 261 and 262 are supplied to an OR gate 263, the output of which is supplied as the clock input to Gray code counter 267. The signal on lead 233 is applied as an input to inhibited AND gate 264, the output of which is applied as the up enable input to counter 267 and, after inversion in inversion circuit 266, as the down enable input to counter 267. Thus counter 267 is up enabled or down enabled alternatively, depending on the signal from gate 264.

The output of OR gate 263 is applied to a sequential circuit which may comprise a Gray code counter 267 and is used to increment or decrement the count in counter 267. The appearance of a ringing code signal on lead 233 therefore serves to increment counter 267, while the absence of ring code decrements counter 267. A Gray code counter is used because such a counter minimizes the number of output leads which must make the transition between one and zero in each count cycle. Counter 267 may, for illustrative purposes, be a three-stage counter, in which case it is capable of generating eight distinct output codes on output leads 269. Leads 269 are connected to a state decoder 270 which decodes the binary Gray code signals to provide an output on one out-of-eight output leads 271. These states or codes have been identified by the letters A through H alongside the output leads from decoder 270.

The A output of decoder 270 on lead 272 is applied to the set input of flip-flop 273. The H output of decoder 270 on lead 274 is applied as the set input to flip-flop 275 and simultaneously as the reset input to flip-flop 273. The A through F outputs of decoder 270 are applied through OR gate 265 as reset inputs to flip-flop 275. The "Q" output of flip-flop 273 comprises the switch hook enable signal on lead 249. This signal is also supplied as the remaining input to AND gate 261. The "Q" output of the flip-flop 273 is supplied by way of lead 277 to the remaining input of AND gate 262. The "Q" output of flip-flop 275 is supplied to one input of inhibited AND gate 278. The inhibit input to gate 278 is supplied on lead 248 and comprises the ring trip signal from the ring trip detector 247 of FIG. 3. When present, this signal on lead 248 also inhibits gate 264 to prevent response to the ring code received signal on lead 233. The output of inhibited AND gate 278 comprises the ring signal on lead 242 which is used to operate the ring relay 244 of FIG. 3.

Figure 5:
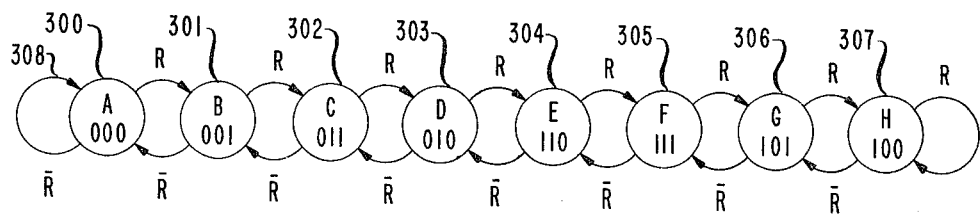
FIG. 5 is a state diagram useful in explaining the operation of the timing circuit of FIG. 4.

The operation of the circuit of FIG. 4 can be better understood by considering the state diagram of FIG. 5. Thus, in FIG. 5 there is shown a state diagram of the timer circuit of FIG. 4 in which the states A through H are indicated by circles 300 through 307. Inside these circles there have been placed the letter designations corresponding to these states identified with the output leads from state decoder 270 in FIG. 4. Below these letter designations are the specific Gray code counts corresponding to the respective states. Transitions between the states are indicated by the directed arrows connecting these circles. Thus, the presence of a ringing code on lead 233 (R) permits the counter 267 to be incremented successively through states 300 through 307 while the absence of such a ringing code ($\overline{R}$) permits counter 267 to be decremented from state 307 back to state 300 by means of the output of AND gate 264 and inverter 266, respectively.

Assuming that ringing signals have not been transmitted at the central office and hence no signal has appeared on lead 233, the counter 267 will be in state 300 due to the decrementing action of signals from AND gate 264. This is indicated by the directed arrow 308 in FIG. 5, indicating that the counter 267 will remain in state 300 as long as no ringing code is received on lead 233. In this state, flip-flop 273 is in a set condition and thus enables AND gate 261 to permit fast clock signals on lead 241 to be applied through OR gate 263 to decrement counter 267 at the fast clock rate. This condition will persist until a signal appears on lead 233 indicating that the central office has initiated ringing signals on the central office appearances corresponding to this channel. The appearance of a signal on lead 233 enables AND gate 264 to permit Gray counter 267 to be incremented at the fast rate. In FIG. 5, this condition is illustrated by the arrows labeled "R", successively advancing from state 300 through states 301, 302, etc., up to state 307. Thus, if the signal persists on line 233 long enough, the circuit of FIG. 4 will proceed to state 307, as noted in connection with FIG. 5. In this state, flip-flop 275 is set to provide an enabling input to gate 278, thus activating lead 242 to enable the ring relay 244 (FIG. 3). If, for example, clock pulses appear on lead 241 every 3 ms, then the circuit of FIG. 4 will proceed from state 300 to state 307 in seven clock pulse periods, that is, in approximately 21 ms. Hence, in order to produce a valid output signal, the ring code must remain on lead 233 for a period of at least 21 ms. Should the signal on lead 233 disappear prior to the end of the 21 ms period, counter 267 will begin decrementing as shown by the state transition arrows near the bottom of the circles 300 through 307, returning the counter toward the state 300. Inadvertent interruptions in the reception of the ringing code will cause the timer of FIG. 4 to decrement the timing period for those periods during which ringing signal code is not received. If the ringing code is an invalid code which subsists for a very short duration, counter 267 will eventually return to state 300 to await the reception of a valid ringing code. On the other hand, if a valid ringing code has been received, counter 267 will eventually count up to state 307 to enable the ringing relay 244.

As noted in connection with FIG. 3, ringing relay 244 connects ring conductor 201 to a ringing signal source on lead 246, thus applying ringing signals to the subscriber telephone set. When the subscriber lifts the telephone handset, the resulting current flow is detected by ring trip detector 247 which supplies a signal on lead 248 to disable gates 264 and 278 in FIG. 4. This removes the enable signals from counter 267 and the output signal from lead 242, thereby releasing the ringing relay 244.

In order to duplicate the four second on and two second off cycle of ringing current placed on the central office appearances of the subscriber conductors in FIG. 2, it is necessary that ringing relay 244 be operated and released in the same cycle. Thus, if the signal is removed from lead 233 prior to ring trip, counter 267 begins to decrement from state 307. Eventually counter 267 reaches state 305 which, as shown in FIG. 4, produces a signal on output lead 276 to reset flip-flop 275 and remove the input to gate 278. The signal on lead 242 therefore disappears and the ring relay is released. It will be noted, however, that once counter 267 arrives at state 307, flip-flop 273 is reset and output lead 277 is enabled to fully enable AND gate 262 and disable gate 261. Thus, the input clock to counter 267 changes from the fast rate clock delivered to AND gate 261 to the slower rate clock delivered to AND gate 262. Since divide-by-four circuit 216 reduces the clock rate by four, the amount of time necessary to count down from state 307 to state 305 is twice this slower clock rate. Assuming, as before, the clock rate on lead 241 is 3 ms, then the period of the clock pulses delivered by circuit 260 is approximately 12 ms. Two such clock periods provides 24 ms between the removal of the signal of lead 233 and the circuit of FIG. 4 reaching state 305. It can thus be seen that the amount of time between the application of ringing code on lead 233 and the operation of ring relay 244 is approximately equal to the amount of time between the removal of ringing code from lead 233 and the release of ring relay 244. Thus, the ringing cycle generated at the central office is duplicated at the remote terminal to preserve the original ringing cycle timing.

If the ringing signal is removed at the central office prior to the appearance of a ring trip signal on lead 248 (due to a cancellation of the cell, for example), counter 267 will continue to be decremented once every 12 ms until it returns to state 300, thus setting flip-flop 273, providing a switch hook enable signal on lead 249, and connecting the fast clock on lead 241 through AND gate 261 and OR gate 263 to counter 267. The time required for counter 267 to decrement from F state 305 to A state 300 when being driven by the slow 12 ms clock is approximately 60 ms (five-12 ms clock periods). This 60 ms delay in the enabling of switch hook detection is necessary to prevent ringing transients on the line from simulating incorrect switch hook information.

It can be seen that the signal sequential circuit such as counter 267 can be used to time the initial delay period, prior to enabling the ringing relay, and the release delay period for releasing the ringing relay while, at the same time, providing a much longer delay before the enablement of switch hook detection following the removal of ringing signals. This longer period can be timed with the same timer circuit by varying the clock pulse rate applied to the timing circuit. This permits the timing of periods varying substantially in duration using the same circuitry rather than providing separate circuitry for timing periods with different durations. Since the entire timing circuit of FIG. 4 is comprised of digital logic circuitry, this entire circuit can be fabricated in integrated circuit form to substantially reduce the size and cost of the timing circuitry.

The timing functions provided for by the timer of FIG. 4 are merely illustrative since many other types of timing functions can be accomplished with a single timing circuit. In the subscriber loop signaling art, for example, other types of supervisory signals such as automatic number identification and coin control supervisory signaling require similar types of timing, all of which can be provided with a single sequential circuit driven by preselected but varied clock rates. Other applications requiring a plurality of widely varying timed intervals are also possible utilizing the principles of the present invention.

I claim:
1. A timing circuit comprising
  a sequential circuit (267),
  at least two sources (261,262) of clock pulses of differing repetition rates,
  means (273) responsive to the output of said sequential circuit for selectively connecting said sources of clock pulses to said sequential circuit, and
  means for selectively advancing or reversing the states of said sequential circuit.
2. The timing circuit according to claim 1 wherein said selective connecting means further comprises
  at least one latching circuit (273), and
  means (272,274) responsive to two different outputs from said sequential circuit for setting and resetting said latching circuit.
3. The timing circuit according to claim 1 further comprising
  a source (233) of signals to be timed, and
  means (264) responsive to said signal to be timed to control said advancing or reversing means.
4. A clock-driven multistate circuit for controlling a plurality of timed operations and including a counter (267) and a count decoder (270), said circuit
  characterized by
  a plurality (261,262) of sources of clock pulses of substantially different repetition rates,
  clock pulse selection means (273), responsive to said count decoder, for selecting one of said plurality of sources, and
  means for selectively incrementing or decrementing said counter.
5. The multistate circuit according to claim 4 wherein said clock pulse selection means is further
  characterized by
  at least one latching circuit (273), said latching circuit being responsive to two different outputs (272,274) from said count decoder for setting and resetting said latching circuit.

6. The multistate circuit according to claim 5 further characterized by a source (233) of signals to be timed, and means (264) responsive to said signals to be timed to control said incrementing and decrementing means.

7. A digital timing circuit for the remote terminal of a telephone subscriber loop transmission system comprising
a sequential circuit,
at least two sources of clock pulses of differing repetition rates,
means responsive to the output of said sequential circuit for selectively connecting said sources of clock pulses to said sequential circuit, and
means responsive to said control signals from the central office terminal of said telephone subscriber loop transmission system for reversing the sequence of transitions in said sequential circuit.

* * * * *